(12) United States Patent
Grubeck

(10) Patent No.: US 9,203,526 B2
(45) Date of Patent: Dec. 1, 2015

(54) METHOD AND SYSTEM FOR IMPROVED INTERFERENCE CANCELLATION BY PATH SELECTION

(75) Inventor: Hans Grubeck, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 223 days.

(21) Appl. No.: 13/703,235

(22) PCT Filed: Sep. 16, 2010

(86) PCT No.: PCT/SE2010/050994
§ 371 (c)(1),
(2), (4) Date: Dec. 10, 2012

(87) PCT Pub. No.: WO2012/036603
PCT Pub. Date: Mar. 22, 2012

(65) Prior Publication Data
US 2013/0077524 A1 Mar. 28, 2013

(51) Int. Cl.
*H04B 15/00* (2006.01)
*H04B 1/7107* (2011.01)

(52) U.S. Cl.
CPC .............. *H04B 15/00* (2013.01); *H04B 1/7107* (2013.01)

(58) Field of Classification Search
CPC .. H04B 15/00; H04B 1/7107; G01R 1/06722; G01R 1/0675; H01R 13/2435; H01R 13/42; Y10T 29/49208
USPC ................... 370/252; 455/63.1, 296, 130, 78; 714/794; 375/340, 341, 260, 348, 141, 375/233, 225
See application file for complete search history.

(56) References Cited

U.S. PATENT DOCUMENTS

| | | | | |
|---|---|---|---|---|
| 6,070,086 A * | 5/2000 | Dobrica | ............... | H04B 7/0857 370/342 |
| 6,614,766 B1 * | 9/2003 | Seki | ................... | H04B 1/71075 370/286 |
| 2002/0146044 A1 * | 10/2002 | Esmailzadeh et al. | ......... | 370/542 |
| 2002/0197958 A1 * | 12/2002 | Collins et al. | ................... | 455/63 |

(Continued)

FOREIGN PATENT DOCUMENTS

| EP | 0923199 | * | 1/1998 | ............. H04B 1/707 |
|---|---|---|---|---|
| EP | 0923199 A2 | | 6/1999 | |
| WO | 2007/109712 A2 | | 9/2007 | |

OTHER PUBLICATIONS

Optimum Power Control for Successive Interference Cancellation With Imperfect Channel Estimation Jeffrey O. Andrews, Member, IEEE, and Teresa H. Meng, Fellow, IEEE.*

(Continued)

*Primary Examiner* — Andrew Lai
*Assistant Examiner* — Mahmudul Hasan
(74) *Attorney, Agent, or Firm* — Sutherland Asbill & Brennan LLP

(57) ABSTRACT

The present invention discloses method and system for improving performance of interference cancellation in a radio communication system. The method comprises: estimating power of an interfering signal contained in a received signal; estimating power of an additive estimate error signal added to the interfering signal; and canceling the interfering signal from the received signal if the estimated power of the additive estimate error signal is lower than the estimated power of the interfering signal. A cellular mobile terminal and a cellular base station comprising the system are also disclosed.

21 Claims, 3 Drawing Sheets

--- a first estimator estimates power of an interference signal contained in a received signal a second estimator estimates power of an additive estimate error signal added to the interference signal a module cancels the interference signal from the received signal if the estimated power of the additive estimate error signal is lower than the estimated power of the interference signal

(56) References Cited

U.S. PATENT DOCUMENTS

| | | | | |
|---|---|---|---|---|
| 2004/0185815 | A1* | 9/2004 | Fukuda | H04B 1/126 455/296 |
| 2006/0067446 | A1* | 3/2006 | Maeda | H04B 1/1027 375/349 |
| 2007/0111669 | A1* | 5/2007 | Malladi | 455/67.13 |
| 2007/0223565 | A1* | 9/2007 | Gaal | H04B 1/71055 375/141 |
| 2008/0043888 | A1* | 2/2008 | Bhukania | H04L 27/2647 375/346 |
| 2009/0086860 | A1* | 4/2009 | Higashinaka | 375/346 |
| 2009/0125793 | A1* | 5/2009 | Kishigami | H04L 1/005 714/794 |
| 2009/0196333 | A1* | 8/2009 | Cozzo | H04L 25/0224 375/225 |
| 2009/0201980 | A1* | 8/2009 | Wu et al. | 375/227 |
| 2009/0227247 | A1* | 9/2009 | Byun | H04B 1/1027 455/423 |
| 2010/0227570 | A1* | 9/2010 | Hendin | H04B 1/006 455/78 |
| 2010/0278059 | A1* | 11/2010 | Wu et al. | 370/252 |
| 2010/0303165 | A1* | 12/2010 | Gore | H04L 25/0202 375/260 |
| 2011/0103520 | A1* | 5/2011 | Molnar | H04L 27/2649 375/340 |
| 2011/0124289 | A1* | 5/2011 | Balachandran | H04J 11/0053 455/63.1 |

OTHER PUBLICATIONS

Andrews et al., "Optimum Power Control for Successive Interference Cancellation with Imperfect Channel Estimation," IEEE Transactions on Wireless Communications, 2003, 2(2):375-383.

Andrews et al., "Amplitude and Phase Estimation Considerations for Asynchronous CDMA with Successive Interference Cancellation (2000)," IEEE Veh. Tech. Conference, 2000, 52nd(3):1211-1215.

PCT International Search Report for PCT Application No. PCT/SE2010/050994 mailed Apr. 21, 2011 (4 pages).

* cited by examiner

METHOD AND SYSTEM FOR IMPROVED INTERFERENCE CANCELLATION BY PATH SELECTION

CROSS REFERENCE TO RELATED APPLICATIONS

This application claims the priority benefit of PCT/SE2010/050994 filed on Sep. 16, 2010. The contents of which are hereby incorporated by reference in its entirety.

TECHNICAL FIELD

The present invention relates to communication technology, and especially to method and system for improving the performance of interference cancellation in communication systems.

BACKGROUND

In cellular systems of today, the user performance can be improved by interference cancellation. Interference cancellation implies that the self-interference or interference from other users are removed or suppressed from the received signal. Multi-path propagation and transmission from different antennas make the signals not orthogonal in the receiver. The non-orthogonal signals will interfere with each other. However, by estimating all signals or a subset of the signals and removing those from the received signal, reduction in the desired signal interference can be achieved. This procedure can be done iteratively for increased performance.

Typically what is done is that the transmitted signal symbols and the channel coefficients for each user are estimated. The channel coefficients consist of the parameters determining the amplitudes, phases, and delays of the received multi-path signal components of a user signal. The transmitted signal is then regenerated and filtered through the estimated channel using the estimated channel coefficients, the channel estimates, to recreate a replica of the received signal for each user. Then for each desired signal, these replicas of the interfering signals can be subtracted, and the interference can be reduced.

Crucial for the cancellation performance is that the channel estimates of each multi-path are of enough high quality. Even though the transmitted signal symbols are estimated correctly, the channel estimation will always be subjected to interference and thermal noise. Especially when low data rate user signals are cancelled from the received signal, the system performance improvement can be considered low. This is because low data rate user signal likely have lower order modulation, where the requirement for the channel estimate qualities are lower than the requirement of higher order modulation for proper demodulation of the transmitted data. Hence, the channel estimate quality may be sufficiently good for demodulation, but may be less good for interference reconstruction.

There are proposals to improve the quality of the estimated channel coefficients by re-estimating them after each interference cancellation iteration. The channel estimates will then also be subjected to interference cancellation and can be used again in the following interference cancellation iteration to improve the interference cancellation performance.

No matter how much the channel estimates are improved, there will always be a question of whether the channel estimate qualities are good enough. Therefore, a method to determine channel estimate qualities for interference cancellation is desired.

DISCLOSURE OF INVENTION

The purpose of the invention is to improve the performance of interference cancellation by path selection, that is, efficiently selecting which recreated paths of a multi-path signal from an interfering user should be cancelled from the received user signal.

An object of the present invention is to provide a method for improving performance of interference cancellation in a radio communication system, the method comprises steps of: estimating power of an interfering signal contained in a received signal; estimating power of an additive estimate error signal added to the interfering signal; and canceling the interfering signal from the received signal if the estimated power of the additive estimate error signal is lower than the estimated power of the interfering signal.

In accordance with a certain embodiment of the invention, the step of estimating power of an interfering signal contained in a received signal comprises: coherently integrating over reference symbols; and calculating power of the coherently integrated reference symbols.

In accordance with a further embodiment of the invention, the step of estimating power of an additive estimate error signal added to the interfering signal comprises: demodulating the reference symbols; and calculating a variance of the demodulated reference symbols.

In accordance with a further embodiment of the invention, the step of canceling the interfering signal from the received signal comprises: estimating channel coefficients of the interfering signal; reconstructing the interfering signal by using the estimated channel coefficients and hard decisions made on transmitted symbols; and canceling the reconstructed interfering signal from the received signal.

In accordance with a further embodiment of the invention, the channel coefficients are estimated by using a weighted average of the reference symbols.

In accordance with a further embodiment of the invention, the power of the interfering signal and the power of the additive estimate error signal are scaled by a scaling factor.

In accordance with a further embodiment of the invention, the reference symbols are one of followings: received pilot symbols, decoded control symbols and decoded data symbols.

In accordance with a further embodiment of the invention, the decoded control symbols are one of followings: non-pilot DPCCH symbols, E-DPCCH symbols and HS-DPCCH.

In accordance with a further embodiment of the invention, the decoded data symbols are DPDCH symbols or E-DPDCH symbols.

An object of the present invention is to provide a system for improving performance of interference cancellation in a radio communication system, the system comprise: a first estimator configured to estimate power of an interfering signal contained in a received signal; a second estimator configured to estimate power of an additive estimate error signal added to the interfering signal; and a means configured to cancel the interfering signal from the received signal if the estimated power of the additive estimate error signal is lower than the estimated power of the interfering signal.

In accordance with a certain embodiment of the invention, the first estimator comprises: a means configured to coherently integrate over reference symbols; and a first calculator configured to calculate power of the coherently integrated reference symbols.

In accordance with a further embodiment of the invention, the second estimator comprises: a demodulator configured to demodulate the reference symbols; and a second calculator configured to calculate a variance of the demodulated reference symbols.

In accordance with a further embodiment of the invention, the means configured to cancel the interfering signal from the received signal comprises: a third estimator configured to estimate channel coefficients of the interfering signal; a means configured to reconstruct the interfering signal by using the estimated channel coefficients and hard decisions made on transmitted symbols; and a means configured to cancel the reconstructed interfering signal from the received signal.

In accordance with a further embodiment of the invention, the third estimator is further configured to estimate the channel coefficients of the interfering signal by using a weighted average of the reference symbols.

In accordance with a further embodiment of the invention, the system further comprises: a means configured to scale the power of the interfering signal and the power of the additive estimate error signal by a scaling factor.

In accordance with a further embodiment of the invention, the reference symbols are one of followings: received pilot symbols, decoded control symbols and decoded data symbols.

In accordance with a further embodiment of the invention, the decoded control symbols are one of followings: non-pilot DPCCH symbols, E-DPCCH symbols and HS-DPCCH.

In accordance with a further embodiment of the invention, the decoded data symbols are DPDCH symbols or E-DPDCH symbols.

An object of the present invention is to provide a cellular mobile terminal, the cellular mobile terminal comprises the system for improving performance of interference cancellation in a radio communication system.

An object of the present invention is to provide a cellular base station, the cellular base station comprises the system for improving performance of interference cancellation in a radio communication system.

The method and system of the present invention will decrease the experienced interference for each radio communication link between the base stations and the mobiles. Therefore, the radio communication system will support more users.

DETAILED DESCRIPTION OF THE INVENTION

Figure 1A:
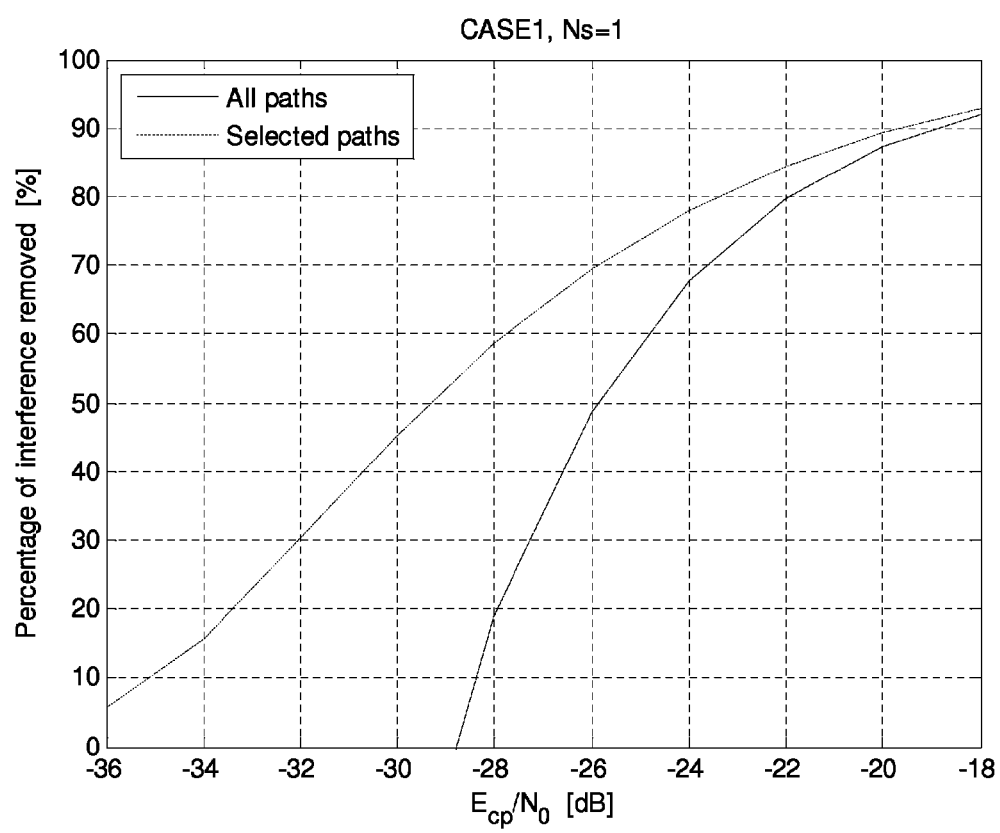
FIG. 1 shows the results of the simulated interference cancellation according to the present invention, wherein the simulated interference cancellation is performed in the 3GPP radio wave propagation channels Case 1.

In one exemplary embodiment, the present invention is implemented in a radio network. The network comprises radio base stations, short base stations, and mobile terminals, short mobiles. The present invention can either be implemented in the receiving parts of the base stations or in the receiving parts of the mobiles.

In this embodiment, the receiving part receives a signal r. The received signal r is the discrete time sampled base-band signal received by one of the receiving antennas. The received signal r is originated from a desired signal s subjected to interference. The desired signal can correspond to one specific received multi-path component of the transmitted signal from one specific desired user, or it can correspond to the total received signal transmitted from one specific desired user.

Besides the desired signal, the received signal also comprises interfering signals, $v_k$ and $w_l$, and noise e, as expressed by equation (1) below. A subset of the interfering signals, $v_k$, can be signals from other users or self interference of the desired signal because of multi-path or multi-antenna transmission. And another subset of the interfering signals is $w_l$, which comprises the rest of the interfering signals. The present invention will focus on the cancellation of $v_k$. The cancellation of $w_l$ will not be discussed in the present invention. Thus, hereinafter, the discussion will focus on how to cancel $v_k$. From the above, the received signal is:

$$r(t) = s(t) + \sum_{k=1}^{N} v_k(t) + \sum_{l=1}^{M} w_l(t) + e(t), \quad (1)$$

wherein t corresponds to sampling time instant.

In order to remove the subset of the interfering signals, $v_k$ from the received signal r to perform interference cancellation, it is required to obtain the estimate of the signals $v_k$, $\hat{v}_k$. The estimate $\hat{v}_k$ can be obtained by demodulating the received signals and making hard decisions on the transmitted symbols and estimating the channel coefficients for those interfering signals. It is noted that the hard decisions are made on the receiver side, but what is actually estimated is the discrete time digital signal at the transmitter side before the influence of transmit- and receive filters, multi-path, interference and noise. After the hard decisions, the influence from the propagation channel is added, such as multi-path etc., and what the signal looks like at the receiver can be figured out. Typical procedures for producing hard decisions and estimates of the channel coefficients are known to the people skilled in the art. These hard symbol decisions can be done before or after decoding. The estimating of the channel coefficients can be made by correlating a received reference signal symbols with a time shifted and frequency shifted known transmitted reference signal symbol sequence. By time shifting this reference symbol sequence and by frequency shifting this reference symbol sequence, a correlation peak indicates the time-offset and the frequency offset of the received signal. The reference symbols should have traveled through the same channel as the interfering signal $v_k$. By using the hard symbol decisions and the channel estimates and prior information about the transmitter and receiver filters, the interfering signals $v_k$ can be reconstructed, forming $\hat{v}_k$, as expressed by equation (2).

$$\hat{v}_k(t) = v_k(t) + n_k(t), \quad (2)$$

wherein $n_k$ is an additive estimate error signal. $n_k$ can be caused by errors in estimating signal amplitude, signal phase, signal Doppler, signal time offset and signal symbols values. $n_k$ can be a complex number or a real number, which can have minus sign and plus sign. It is assumed that $P_k$ is the power of the signal $v_k$ and $I_k$ is the power of the additive estimate error $n_k$. If $\hat{v}_k$ is removed from r, then $\tilde{r}(t)$ can be obtained as equation (3):

$$\tilde{r}(t) = r(t) - \hat{v}_k(t). \quad (3)$$

In this way, the power of $v_k$ will be removed from the received signal r, but the power of the additive estimate error signal $n_k$ will be added to the received signal r, forming a new received signal r̃(t), as expressed by equation (3). The net interference power added to the received signal r will be C, wherein $$C = I_k - P_k. \quad (4)$$

If C is less than zero, the cancellation of the estimated interference signal $\hat{v}_k$ will yield decreased interference in the received signal compared to not doing the above interference cancellation. However, if C is greater than zero, the cancellation of the estimated interference signal $\hat{v}_k$ will yield increased interference in the received signal. Thus, it can be deduced that if C is greater than zero, the cancellation of the estimated interference signal $\hat{v}_k$ should not be performed, since in this case the interference in the received signal will be increased. In other words, whether performing the estimated interference signal cancellation will be determined according to the sign of the value of C. This is the main idea of this invention. Specifically, let $\hat{P}_k$ and $\hat{I}_k$ be estimates of $P_k$ and $I_k$ respectively, if $\hat{I}_k - \hat{P}_k < 0$, then $\hat{v}_k$ can be cancelled according to the embodiment of the present invention. That is, the reconstructed interfering signal can be cancelled if the estimated power of the additive estimate error is less than the estimated power of the interference signal. The signal with interference cancelled can then be further demodulated using conventional techniques.

According to the embodiment described above, the method for improving the performance of interference cancellation comprises the following steps:

estimating power of an interfering signal contained in a received signal;

estimating power of an additive estimate error signal added to the interfering signal; and canceling the interfering signal from the received signal if the estimated power of the additive estimate error signal is lower than the estimated power of the interfering signal.

In another exemplary embodiment, it is assumed that the estimate errors of the channel coefficients can be made small for signal Doppler, signal time offset and signal symbols values. Then only the estimates of the amplitude and phase of the signal will contribute to the additive estimate error signal. The estimates of the amplitude and phase and the corresponding powers of the additive estimate errors signal can be obtained by using reference symbols and by using well know techniques. For example, in WCDMA the reference symbols can be the pilot symbols. By well known techniques, performing coherent integration over several received pilot symbols on a Rake finger corresponding to the sample timing according to a specific multi-path component of an interfering signal, estimates of the amplitude and phase of the pilot reference signal is achieved. The power of the coherently integrated received pilots can be used as the estimate of the power of the interference signal to be cancelled. Meanwhile, the same received pilot bit pattern demodulated symbols can be used as samples to estimate the variance of the received pilot bit pattern demodulated pilot symbols, which can be used as the estimate of the power of the additive estimate error signal.

Additionally, the reference signal and the transmitted signal yielding the interference signal $v_k$ may be transmitted with different powers. Hence, it is noted that both of the power of the interference signal and the power of the additive estimate error signal may be scaled by a same factor to get the corresponding power values for the reconstructed interference signal $\hat{v}_k$. However, the scaling factor can be omitted since it has no influence on whether performing the interference cancellation as described above. This can be shown by the following formulas. Assume $\tilde{P}_k$ and $\tilde{I}_k$ are the estimated powers of the channel estimate and the channel estimate error for an interfering signal, denoted by the index k. Assume that the channel estimate needs to be scaled by a factor $\alpha_k$ to get the same amplitude as the interference signal $v_k$. Then the scaled channel estimate is:

$$\hat{P}_k = \alpha_k^2 \cdot \tilde{P}_k. \quad (5)$$

Scaling the channel estimate by this factor will also scale the additive estimate error, and the scaled channel estimate error is:

$$\hat{I}_k = \alpha_k^2 \cdot \tilde{I}_k. \quad (6)$$

The interference cancellation criterion is $$\hat{I}_k - \hat{P}_k < 0 \Leftrightarrow \alpha_k^2 \cdot \tilde{I}_k - \alpha_k^2 \cdot \tilde{P}_k < 0 \Leftrightarrow$$
$$\alpha_k^2 \cdot (\tilde{I}_k - \tilde{P}_k) < 0 \Leftrightarrow \tilde{I}_k - \tilde{P}_k < 0.$$

Hence, the scaling can be omitted for the sake of the interference cancellation criterion.

The specific embodiments in which the present invention is implemented will be described below. It is assumed that the present invention is implemented in a WCDMA radio network. It is also assumed that a specific multi-path component from a specific interfering user, denoted by an index k, is desired to be cancelled from the received signal. In one exemplary embodiment, $N_P$ received DPCCH pilot symbols from this user corresponding to this path delay are used with equal weight for channel estimation, i.e. the channel estimate is formed by an weighted average of $N_P$ pilot bit pattern demodulated pilot symbols. It is noted that the weighs used can be "1". In other embodiments, the method can be extended to include any set of reference symbols with any kind of weighting from any physical channel. More generally, the reference symbols can be pilot symbols, decoded control symbols, and decoded data symbols. In some embodiments, the decoded control symbols could be non-pilot DPCCH symbols, E-DPCCH symbols or HS-DPCCH. Additionally, in some embodiments, the decoded data symbols could be DPDCH symbols or E-DPDCH symbols. After decoding of these symbols, they are known and hence, they can be used as reference symbols for channel estimation. It is assumed that, for example, $N_M$ pilot bit pattern demodulated DPCCH pilot symbols x(m,k), m=I,K,$N_M$, are available for performing power estimates.

The scaled estimated power of the interfering signal is calculated by equations (7) and (8):

$$\bar{x}(k) = \frac{1}{N_M} \cdot \sum_{m=1}^{N_M} x(m, k), \quad (7)$$

$$\hat{P}_k = |\bar{x}(k)|^2, \quad (8)$$

wherein the "scaled estimated power" means that the power difference between the reference signal and the interference signal $v_k$ is omitted for simplicity.

An estimate of the interference on the pilot symbols I used for the channel estimation can be made by $$I(k) = \frac{1}{N_M - 1} \cdot \sum_{m=1}^{N_M} |x(m, k) - \bar{x}(k)|^2, \quad (9)$$

wherein the coefficient $$"\frac{1}{N_M - 1}"$$

is used to get a correct expected value of the variance estimate, which is just a mathematical means. Then the added scaled interference power due to noisy channel estimates is $$\hat{I}_k = \frac{1}{N_P} \cdot I(k). \tag{10}$$

It can be seen that in the above embodiment, the weight used is "1".

In order for this particular interference signal to yield reduced interference after interference cancellation, the following requirement must be met:

$$\hat{I}_k - \hat{P}_k < 0. \tag{11}$$

If instead, the requirement is not met, the interference cancellation of this particular path should not be performed.

Figure 1B:
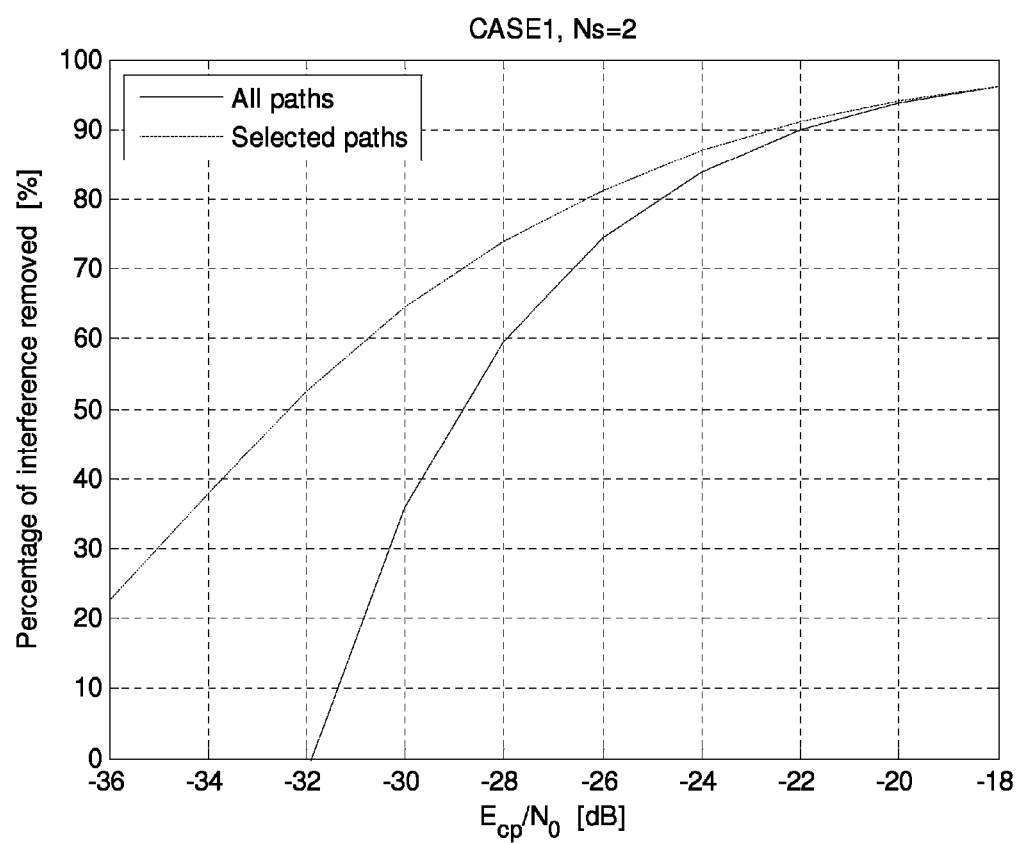
Figure 2:
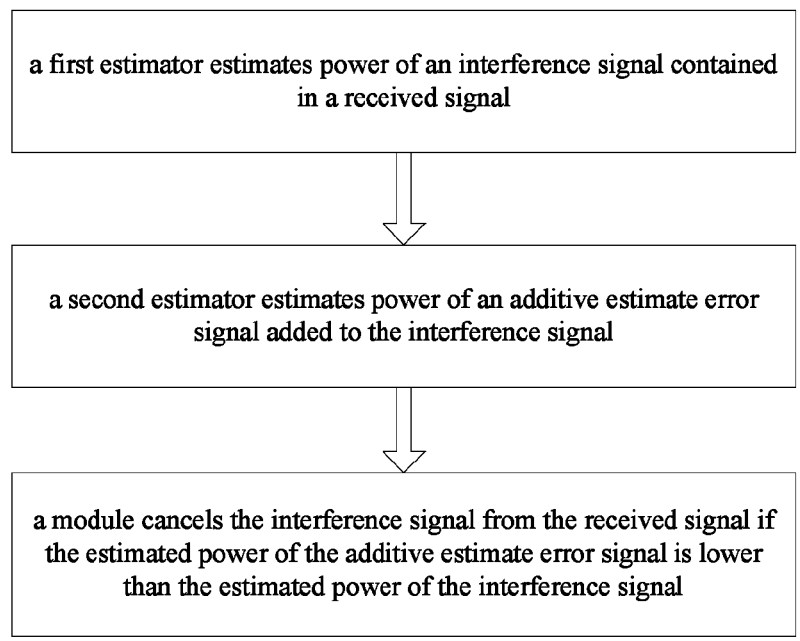
FIG. 2 is a flow diagram according to the present invention, wherein the performance of interference cancellation in a radio communication system is improved.

The simulation according to the present invention is performed. The simulation is performed on the net removed interference after interference cancellation in uplink. In FIG. 1, the performance of the method using path selection according to the present invention is compared with the performance of a method in which all paths are always used for interference cancellation. The path selection can be performed every slot in a frame. In the simulation, it is assumed that ideal symbol power and symbol variance estimates are available for each path. The 3GPP radio wave propagation channel Case 1 is simulated. The number of integrated DPCCH symbols for the channel estimates is varied between 10 and 20, including pilots and perfectly decoded non-pilots. This corresponds to one-slot or two-slot coherent integration, which are denoted by $N_S=1$ and $N_S=2$ in FIG. 1. The channel is assumed to be constant over two slots. In the simulation, perfect path search functionality is used.

The simulated test results are shown in FIG. 1. It can be noticed that the performance improvement is substantial in the lower signal to noise ratio region. In the higher signal to noise ratio region, the performance improvement is small. In FIG. 1, $E_{cp}/N_0$ is the energy per DPCCH chip over the noise spectral density.

The system for improving the performance of interference cancellation according to the present invention can be presented correspondingly. The system comprises:

a first estimator configured to estimate power of an interfering signal contained in a received signal;

a second estimator configured to estimate power of an additive estimate error signal added to the interfering signal; and a means configured to cancel the interfering signal from the received signal if the estimated power of the additive estimate error signal is lower than the estimated power of the interfering signal.

Specifically, the first estimator can comprise a means to coherently integrate over reference symbols; and a calculator to calculate power of the coherently integrated reference symbols. And the second estimator can comprise a demodulator to demodulate the reference symbols; and a calculator to calculate a variance of the demodulated reference symbols. Also, the means configured to cancel the interfering signal can comprise a third estimator to estimate channel coefficients of the interfering signal; a means to reconstruct the interfering signal by using the estimated channel coefficients and hard decisions made on the transmitted symbols; and a means to cancel the reconstructed interfering signal from the received signal.

Specifically, the third estimator estimate the channel coefficients of the interfering signal by using a weighted average of the reference symbols.

Specifically, the system further comprises a means to scale the power of the interfering signal and the power of the additive estimate error signal by a scaling factor, as described above.

Specifically, the reference symbols can be one of followings: received pilot symbols, decoded control symbols, such as for example non-pilot DPCCH symbols, E-DPCCH symbols or HS-DPCCH, and decoded data symbols, such as for example DPDCH symbols or E-DPDCH symbols.

The method according to the present invention can be implemented by cellular mobile terminals and cellular base stations to improving performance of interference cancellation. And accordingly, the cellular mobile terminals and the cellular base stations can comprise the system according to the present invention to improving performance of interference cancellation.

INDUSTRIAL APPLICABILITY

The method of the present invention will decrease the experienced interference for each radio communication link between the base stations and the mobiles. Hence, there will be room for more interference before the proper working point is reached, which can be achieved by adding more users in the system. This will be beneficial for a radio network operator, since more users can generate more revenue.

While the embodiments of the invention have been illustrated and described, it is not intended that these embodiments illustrate and describe all possible forms of the invention. Rather, the words used in the specification are words of description rather than limitation, and it is understood that various changes and modifications may be made without departing from the spirit and scope of the invention.

What is claimed is:

1. A method for improving performance of interference cancellation in a radio communication system, comprising steps of:

estimating power of an interference signal contained in a received signal;

estimating power of an additive estimate error signal added to the interference signal; and canceling the interference signal from the received signal if the estimated power of the additive estimate error signal is lower than the estimated power of the interference signal;

wherein the interference signal is caused by multi-path or muti-antenna transmission or self-interference; and the additive estimate error signal is the error between the interference signal and a reconstructed interference signal according to channel estimation.

2. A method according to claim 1, wherein the step of estimating power of an interference signal contained in a received signal comprises:

coherently integrating over reference symbols; and calculating power of the coherently integrated reference symbols.

3. A method according to claim 1, wherein the step of estimating power of an additive estimate error signal added to the interference signal comprises:
   demodulating the reference symbols; and
   calculating a variance of the demodulated reference symbols.

4. A method according to claim 1, wherein the step of canceling the interference signal from the received signal comprises:
   estimating channel coefficients of the interference signal;
   reconstructing the interference signal by using the estimated channel coefficients and hard decisions made on transmitted symbols; and
   canceling the reconstructed interference signal from the received signal.

5. A method according to claim 1, wherein the power of the interference signal and the power of the additive estimate error signal are scaled by a scaling factor.

6. A method according to claim 2, wherein the reference symbols are one of followings: received pilot symbols, decoded control symbols, and decoded data symbols.

7. A method according to claim 2, wherein the step of estimating power of an additive estimate error signal added to the interference signal comprises:
   demodulating the reference symbols; and
   calculating a variance of the demodulated reference symbols.

8. A method according to claim 4, wherein the channel coefficients are estimated by using a weighted average of the reference symbols.

9. A method according to claim 6, wherein the decoded control symbols are one of followings: non-pilot DPCCH symbols, E-DPCCH symbols and HS-DPCCH.

10. A method according to claim 6, wherein the decoded data symbols are DPDCH symbols or E-DPDCH symbols.

11. An apparatus for improving performance of interference cancellation in a radio communication system, comprising at least one processor for performing:
   a first estimator configured to estimate power of an interference signal contained in a received signal;
   a second estimator configured to estimate power of an additive estimate error signal added to the interference signal; and
   a module configured to cancel the interference signal from the received signal if the estimated power of the additive estimate error signal is lower than the estimated power of the interference signal;
   wherein the interference signal is caused by multi-path or muti-antenna transmission or self-interference; and the additive estimate error signal is the error between the interference signal and a reconstructed interference signal according to channel estimation.

12. An apparatus according to claim 11, wherein the first estimator comprises:
   a module configured to coherently integrate over reference symbols; and
   a first calculator configured to calculate power of the coherently integrated reference symbols.

13. An apparatus according to claim 11, wherein the second estimator comprises:
   a demodulator configured to demodulate the reference symbols; and
   a second calculator configured to calculate a variance of the demodulated reference symbols.

14. An apparatus according to claim 11, wherein the module configured to cancel the interference signal from the received signal comprises:
   a third estimator configured to estimate channel coefficients of the interference signal;
   a module configured to reconstruct the interference signal by using the estimated channel coefficients and hard decisions made on transmitted symbols; and
   a module configured to cancel the reconstructed interference signal from the received signal.

15. An apparatus according to claim 11, further comprising:
   a module configured to scale the power of the interference signal and the power of the additive estimate error signal by a scaling factor.

16. An apparatus according to claim 11, wherein the apparatus is a cellular mobile terminal.

17. An apparatus according to claim 11, wherein the apparatus is a cellular base station.

18. An apparatus according to claim 12, wherein the reference symbols are one of followings: received pilot symbols, decoded control symbols, and decoded data symbols.

19. An apparatus according to claim 14, wherein the third estimator is further configured to estimate the channel coefficients of the interference signal by using a weighted average of the reference symbols.

20. An apparatus according to claim 18, wherein the decoded control symbols are one of followings: non-pilot DPCCH symbols, E-DPCCH symbols and HS-DPCCH.

21. An apparatus according to claim 18, wherein the decoded data symbols are DPDCH symbols or E-DPDCH symbols.

* * * * *